(12) United States Patent
Hiramatsu

(10) Patent No.: US 6,922,266 B2
(45) Date of Patent: Jul. 26, 2005

(54) COLOR MANAGEMENT SYSTEM

(75) Inventor: Naoko Hiramatsu, Kyoto (JP)

(73) Assignee: Minolta Co., Ltd., Osaka (JP)

( * ) Notice: Subject to any disclaimer, the term of this patent is extended or adjusted under 35 U.S.C. 154(b) by 938 days.

(21) Appl. No.: 09/725,716

(22) Filed: Nov. 30, 2000

(65) Prior Publication Data

US 2001/0038468 A1 Nov. 8, 2001

(30) Foreign Application Priority Data

Nov. 30, 1999 (JP) .......................................... P11-339021

(51) Int. Cl.$^7$ .............................................. G03F 3/08
(52) U.S. Cl. ........................ 358/518; 358/520; 358/523; 358/515; 382/167
(58) Field of Search ................. 358/518, 515, 358/516, 519, 520, 522, 523, 536; 382/162, 167; 345/155

(56) References Cited

U.S. PATENT DOCUMENTS

| | | | | | |
|---|---|---|---|---|---|
| 5,754,184 A | * | 5/1998 | Ring et al. | ................... | 345/604 |
| 5,786,823 A | * | 7/1998 | Madden et al. | ............. | 345/591 |
| 5,818,960 A | * | 10/1998 | Gregory et al. | ............. | 382/167 |
| 5,835,627 A | * | 11/1998 | Higgins et al. | ............. | 382/167 |
| 6,044,173 A | * | 3/2000 | Kumada | ..................... | 382/167 |
| 6,088,038 A | * | 7/2000 | Edge et al. | .................. | 345/600 |
| 6,118,455 A | * | 9/2000 | Hidaka et al. | ............... | 345/589 |
| 6,198,552 B1 | * | 3/2001 | Nagae | ......................... | 358/518 |
| 6,307,961 B1 | * | 10/2001 | Balonon-Rosen et al. | .. | 382/167 |
| 6,320,980 B1 | * | 11/2001 | Hidaka | ........................ | 382/167 |
| 6,362,808 B1 | * | 3/2002 | Edge et al. | .................. | 345/601 |
| 6,388,674 B1 | * | 5/2002 | Ito et al. | ...................... | 345/590 |
| 6,603,483 B1 | * | 8/2003 | Newman | ..................... | 345/593 |
| 6,611,621 B2 | * | 8/2003 | Shiraiwa | ..................... | 382/167 |
| 6,633,668 B1 | * | 10/2003 | Newman | ..................... | 382/166 |

FOREIGN PATENT DOCUMENTS

JP            10-79865          3/1998

\* cited by examiner

Primary Examiner—Kimberly Williams
Assistant Examiner—Tia Carter
(74) Attorney, Agent, or Firm—Burns, Doane, Swecker & Mathis, LLP

(57) ABSTRACT

In the color management system, output profile of each connected output device is detected and a color reproduction region which is a region in color space is obtained. The color reproduction region is a range of color which can be reproduced by the output device. The conjunction of all color reproduction regions is obtained as a common color reproduction region and an edit profile restricted to the common color reproduction region is generated and updated. The range of the color information in image data for image editing is restricted to the common color reproduction region. Thereby, color space compression is unnecessary when outputting an image from each output device, and output images from output devices have the same color tone.

36 Claims, 17 Drawing Sheets

COLOR MANAGEMENT SYSTEM

This application is based on application No. 11-339021 (1999) filed in Japan, the contents of which are hereby incorporated by reference.

BACKGROUND OF THE INVENTION

1. Field of the Invention

The present invention relates to a color management system to be connected with a plurality of output devices for executing color reproduction in accordance with image data.

2. Description of the Background Art

A color management system for managing color information has been introduced for processing an image by a computer or through a computer network. The color management system converts color information in image data in order to make output devices such as displays or printers, which are connected to the system, execute proper color reproduction.

For example, to print edited image data by a printer while viewing a display, color information is mapped between the display and the printer (or among three devices including a calibration device). In this case, if the range where the display can reproduce color (a region in color space which is hereafter referred to as "a color reproduction region") exceeds the color reproduction region of the printer, the color information in image data which is edited with viewing a display is compressed into the color reproduction region of the printer in the color space.

However, when a plurality of output devices are connected to a computer, for example, a plurality of printers are connected, it is necessary to execute compression in color space (hereinafter referred to as "color space compression") suitable for each printer, and color space compression is necessary for every printing. Therefore, the output speed of image data is lowered. Moreover, color tone reproduced by each printer delicately differs due to color space compression.

The official gazette of Japanese Patent Application Laid-Open No. 10-79865(1998) discloses an art that a common color reproduction region where a plurality of printers connected to a computer can reproduce color is obtained and the color information in image data is compressed into the common color reproduction region in color space when printing is performed. According to the above art, it is possible to commonize color reproduction regions for printing.

However, the art is the same as the prior art in that color space compression is executed every printing and output speed of image data may be insufficient.

On the other hand, when a plurality of displays different from each other in characteristic are connected to a computer network, image data which has been edited on a display is edited on another display again. Also in this case, if color reproduction regions for displays are different from each other, color space compression is necessary. As a result, the efficiency of editing image data is deteriorated, and color tone of an image changes between displays.

SUMMARY OF THE INVENTION

The present invention is directed to a color management system to be connected with a plurality of output devices which execute color reproduction in accordance with image data.

In an aspect of the present invention, the system comprises: means for obtaining a plurality of color reproduction regions from at least two output devices included in the plurality of output devices, the plurality of color reproduction regions corresponding to regions in color space where the at least two output devices can reproduce color, respectively; means for generating a common color reproduction region included in any of the plurality of color reproduction regions; and means for restricting range of color information included in image data to the common color reproduction region before image data is handled.

The frequency of color space compression for outputting image data reduces and images output from at least two output devices have the same color tone.

In another aspect of the present invention, the common color reproduction region is generated as a region in common color space independent of the at least two output devices, the means for restricting range of color information generates a profile for converting the region in the common color space to a region in color space for editing image data, and the color management system handles the image data in the color space for editing.

The present invention is also directed to a color management method performed on a color managing system and a computer-readable medium carrying a program for color managing on a computer.

Accordingly, an object of the present invention is to output image data quickly by reducing the frequency of color space compression in a color management system.

These and other objects, features, aspects, and advantages of the present invention will become more apparent from the following detailed description of the present invention when taken in conjunction with the accompanying drawings.

DESCRIPTION OF THE PREFERRED EMBODIMENTS

<1. First Preferred Embodiment>

Figure 1:
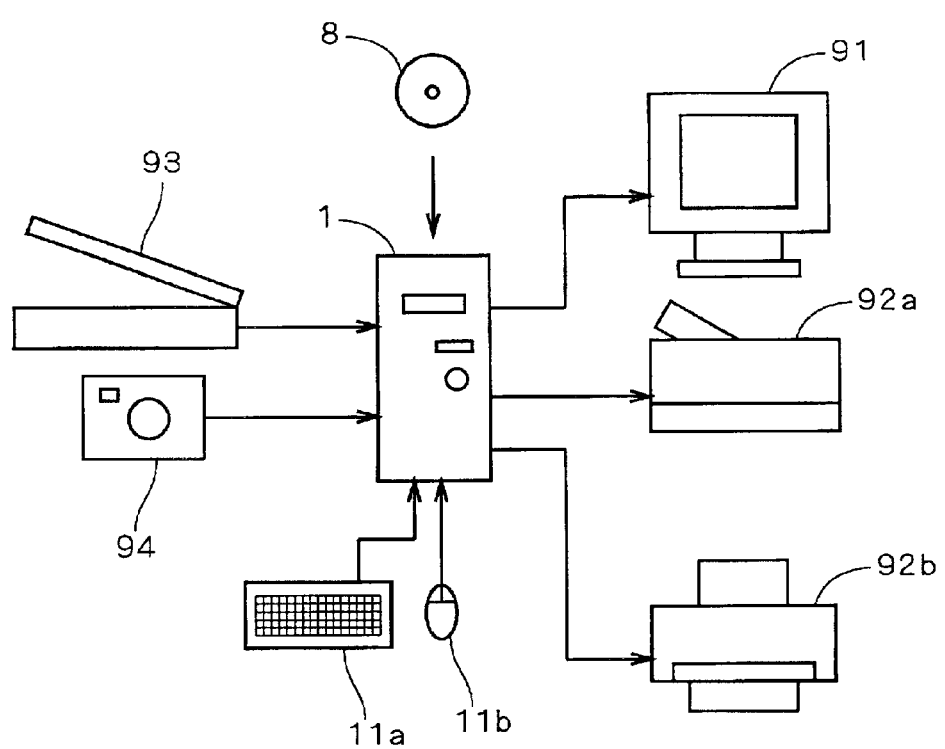
FIG. 1 shows a configuration of a color management system of the first preferred embodiment.

FIG. 1 is an illustration showing a configuration for realizing the color management system of the first preferred embodiment of the present invention by a computer 1. The computer 1 is connected with a display 91, a printer 92a, a printer 92b, a scanner 93, a digital camera 94 and so on to perform control and color management of these devices. The computer 1 is also connected with a keyboard 11a and a mouse 11b as an operating section for receiving inputs from an operator.

The computer 1 performs color management of connected devices by executing an exclusive color management program and the program is installed in the computer 1 through a recording medium, for example, an optical disk such as a CD-ROM 8, a magnetic disk or an opti-magnetic disk.

Figure 2:
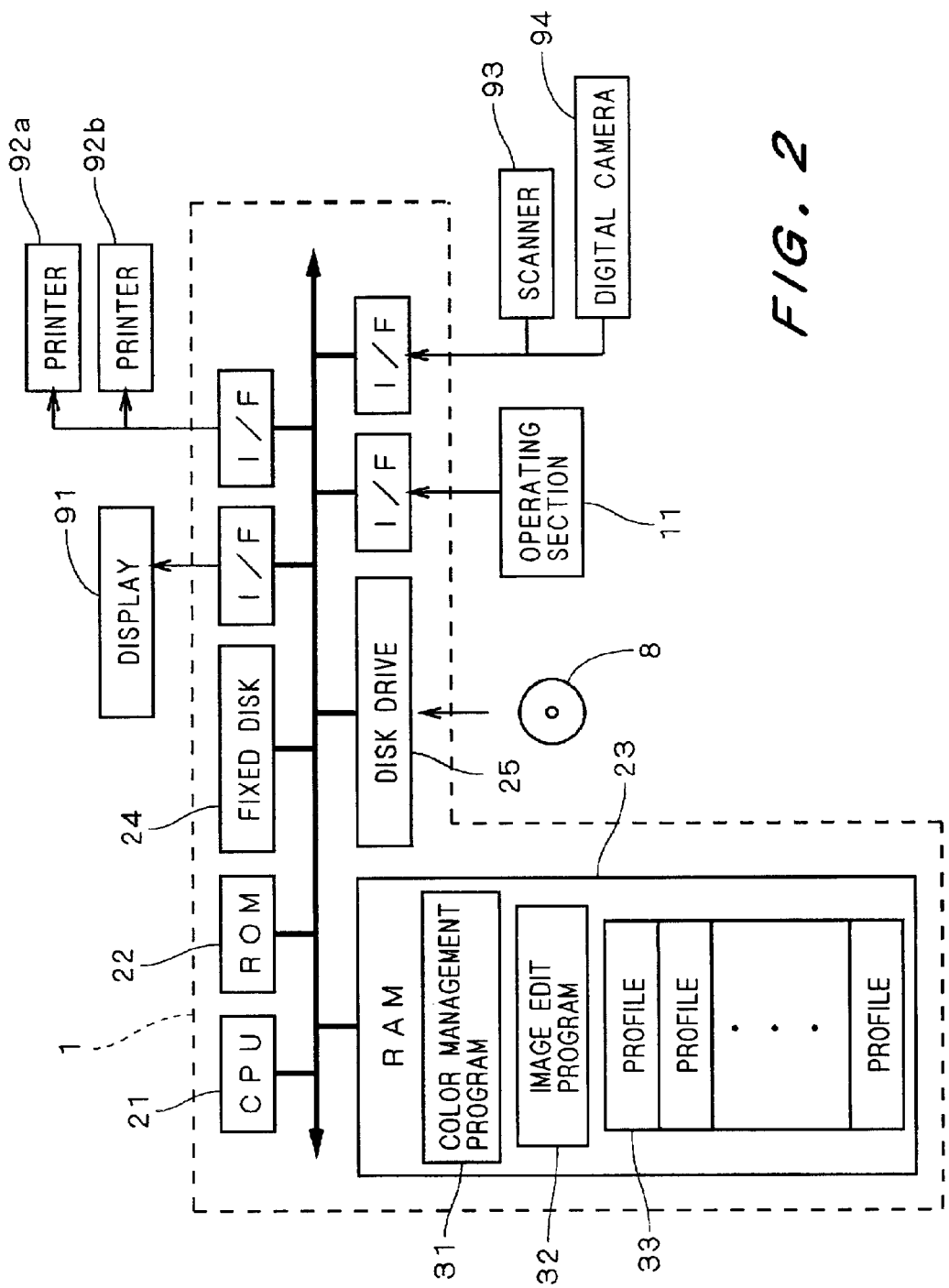
FIG. 2 is a block diagram showing the internal components of the computer in FIG. 1 together with other components.

FIG. 2 is a block diagram showing the internal configuration of the computer 1 together with connected devices. The computer 1 is constituted similarly to a normal computer, and a CPU 21 for executing arithmetic processings, a ROM 22 for storing a basic program, and a RAM 23 for storing a color management program 31, an image edit program 32, and profiles 33 for various devices are connected to a bus line. The RAM 23 also serves as a work area for processing.

The bus line is further connected with a fixed disk 24 for storing various data and a disk drive 25 for reading out a program etc. from the CR-ROM 8 properly through an interface. Furthermore, the bus line is connected with interfaces (I/F) for connecting the display 91, the printer 92a, the printer 92b, the scanner 93, and the digital camera 94 and so on which are external devices.

FIG. 2 illustrates the keyboard 11a and the mouse 11b as an operating section 11.

Figure 3:
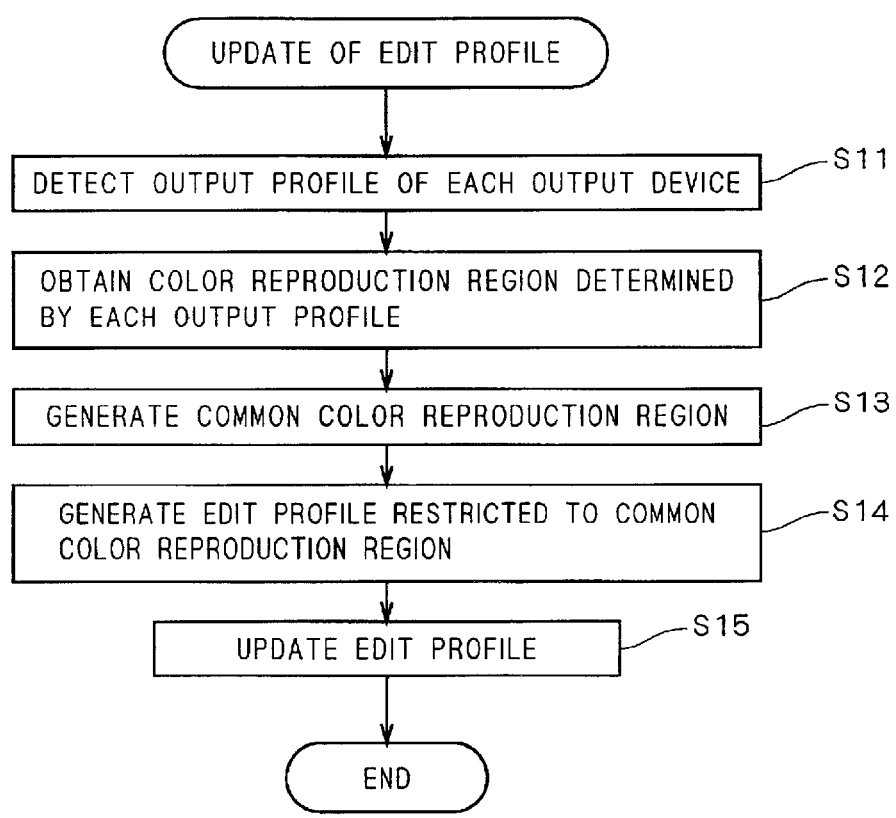
FIG. 3 is a flowchart showing operations of the color management system of the first preferred embodiment.

FIG. 3 is a flowchart showing update of an edit profile executed before the computer 1 receives and delivers image data from and to each device, and illustrates the basic operation of a color management system.

Various processes which will be hereinafter described in the present specification as being performed by the computer 1, i.e., the color management system are, more specifically, performed by the CPU 21 in accordance with a program and/or data stored in the RAM 23.

First, the computer 1 detects output profiles for output devices which execute color reproduction in accordance with image data by outputting the image data from the computer 1. In the case of the connection example shown in FIG. 1, output profiles of the display 91 for displaying an image and the printers 92a and 92b for printing images (step S11).

An output profile denotes the data including the data for converting original color information for an output device to execute proper color reproduction and the data showing a range of color reproduction by the output device. Specifically, an output profile stores the data for color conversion or a range of color reproduction in the form of LUT or the maximum brightness (or density) and γ curve of each color.

Then, the computer 1 obtains a range of color reproduction of each output device by referring to the output profile (step S12). A range of color reproduction is a region determined in the form of a color solid in color space (that is, a three-dimensional calorimetric system) and is referred to as "a color reproduction region" in the following description.

Any color space is available, and in this preferred embodiment, L*a*b* color space is used as common color space which is independent of devices such as the display 91 using RGB color space or the printers 92a and 92b using CMY color space. It is also allowed to use XYZ color space.

Figure 4:
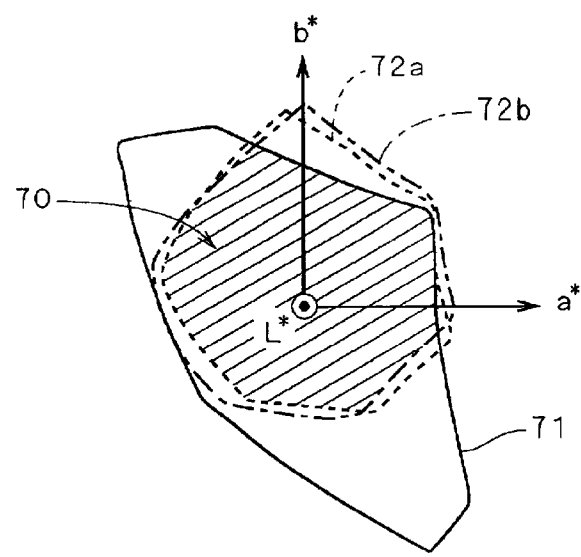
FIG. 4 is a schematic view showing the way to obtain a common color reproduction region.

FIG. 4 is an illustration showing the color reproduction region of each output device in L*a*b* color space and symbols 71, 72a, and 72b denote color reproduction regions of the display 91, the printer 92a, and the printer 92b. The color reproduction regions also expand in the direction vertical to the page space and FIG. 4 schematically two-dimensionally shows the regions viewed in the direction of the L*-axis.

After obtaining color reproduction regions corresponding to output devices, a common color reproduction region included in all these color reproduction regions is generated (step S13). Specifically, the conjunction (logical AND) of three these color reproduction regions in FIG. 4 is obtained as a common color reproduction region. In FIG. 4, the common color reproduction region 70 is shown by parallel slashes on a two-dimensional plane (a*b* plane). However, this is only an expression for convenience' sake. Actually, the common color reproduction region 70 is obtained as a three-dimensional solid.

To simplify the information of the common color reproduction region 70, it is allowed to use a method of approximating the common color reproduction region 70 to a polyhedron and a specific example will be described in the second preferred embodiment.

When the common color reproduction region 70 is obtained, an edit profile is generated (step S14). The edit profile restricts the range of color information included in the image data which is to be handled to the common color reproduction region 70. The edit profile is the data used in converting image data between general-purpose L*a*b color space and the whole color space for editing and in the case of this preferred embodiment images are edited in RGB color space. Then, by generating the edit profile so that L*a*b values corresponding to any RGB values in the image data is included in the common color reproduction region 70, the color information in image data to be generated through editing is substantially restricted to the common color reproduction region 70.

When the edit profile is generated, the edit profile is updated in the computer 1 and thereafter, the color information for color reproduction by each output device is substantially restricted to the color information in the new common color reproduction region 70 (step S15).

Figure 5:
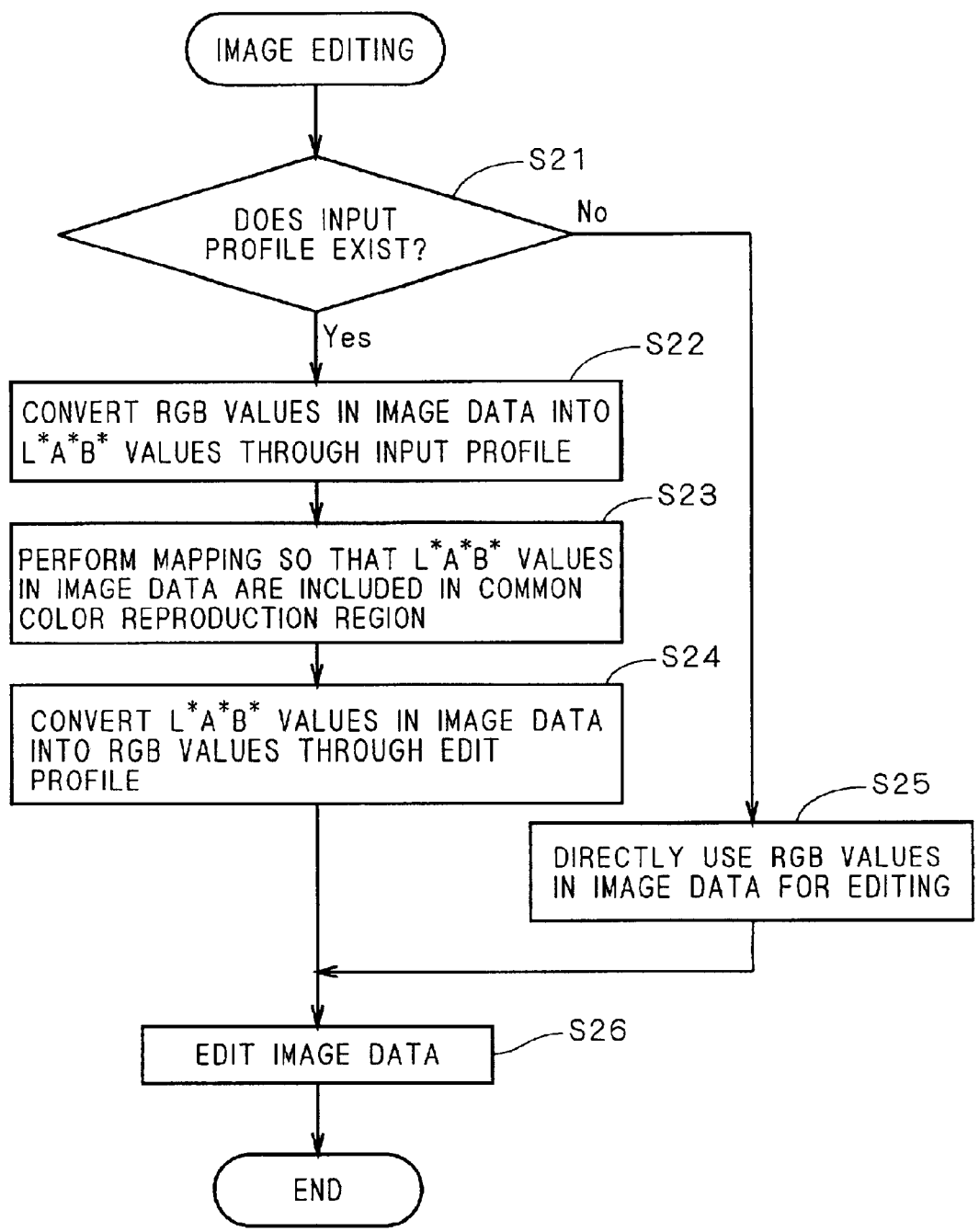
FIG. 5 is a flowchart showing the outline of operations for inputting an image for image editing.
Figure 6:
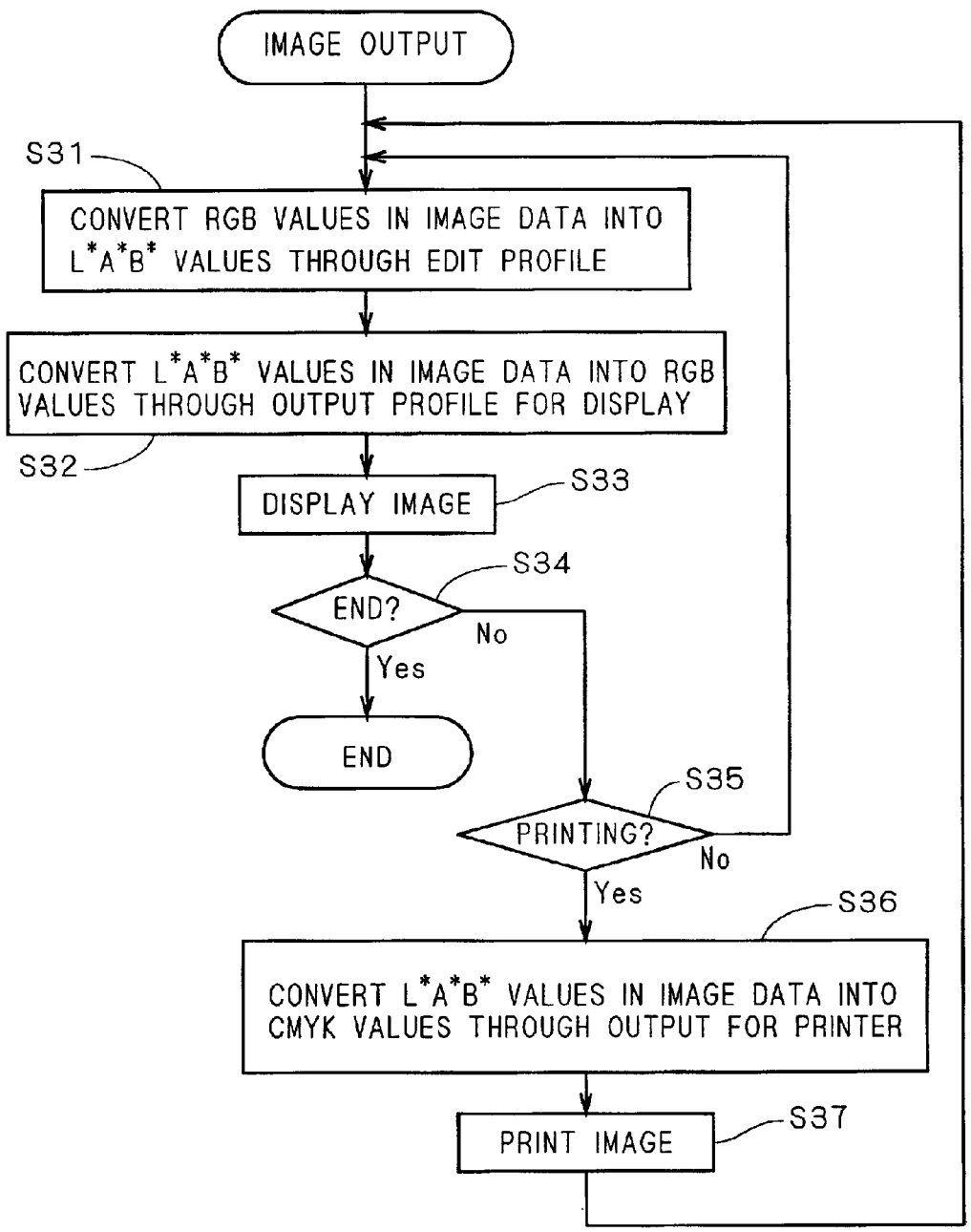
FIG. 6 is a flowchart showing operations for outputting an image under image editing.

Then, image editing and printing by the computer 1 and the connected devices shown in FIG. 1 are described below by referring to FIGS. 5 and 6. The operations shown in FIGS. 5 and 6 are mainly realized by execution of the image edit program 32 on the computer 1. However, operations may be partially realized by an operating system.

FIG. 5 is an illustration showing a flow of operations for inputting image data under image editing. If an input profile for correcting input image data exists like in the case of the scanner 93, RGB values in image data is first converted into L*a*b values through the input profile (steps S21 and S22). XYZ values are available as substitution of L*a*b* values.

Mapping is executed so that the L*a*b* value in the image data is included in the common color reproduction region 70 (step S23). In this processing, color space compression is executed if necessary. Furthermore, the L*a*b* values in the image data is converted into RGB values for editing through the edit profile (step S24) and converted image data is used for image editing.

As described above, if an input profile corresponding to image data exists, conversion through the input profile, mapping, and conversion through the edit profile are executed. These conversions are also executed for the image data that is obtained through computer communication and in which an input profile is included.

If an input profile corresponding to image data does not exist like in the case of the image data obtained by the digital camera 94 or the image data stored in the fixed disk 24, RGB values in the image data is directly handled as RGB values for image editing (steps S21 and S25).

After the RGB values for editing in the image data is determined, desired image editing is performed in the RGB color space (step S26).

As described above, all of RGB values in the image data to be edited are related to the color information in the common color reproduction region 70 through the edit profile. Therefore, the processing for determining RGB values in input image data corresponds to the processing of relating the color information in the image data to the common color reproduction region 70, and the processing of handling the image data in RGB color space corresponds to the processing of restricting the color information in the image data to the common color reproduction region 70 and handling the color information.

Then, operations of an output device while image data is edited by the computer 1 executing the image edit program are described below by referring to FIG. 6. FIG. 6 shows only operations when images are output to the display 91 and the printers 92a and 92b. At any stage in the operations, image editing (such as correction of color and modification of an image) is performed by an operator while viewing the display 91.

First, an image which is in the middle of editing is repeatedly displayed on the display 91 by the computer 1. In this operation, RGB values for editing in the image data are converted into L*a*b* values through the edit profile (step S31) and, the L*a*b* values are further converted into RGB values through an output profile for the display 91 (step S32). Thereby, an image is displayed on the display 91 in accordance with the image data (step S33).

In this case, all of the color information in the image data converted into the L*a*b* values through the edit profile is included in the common color reproduction region 70. Therefore, the color information is also included in the color reproduction region 71 of the display 91 and color space compression is not executed for the color conversion in step S32. That is, color reproduction is executed on the display 91 in a range restricted to the common color reproduction region 70.

When printing is designated by the operator while displaying on the display 91 is repeatedly performed (steps S34 and S35), the computer 1 further converts the image data, which is converted into the L*a*b values through the edit profile (step S31), into CMYK values through an output profile for the printer (step S36) and printing is performed by the printer in accordance with the converted image data (step S37).

In this case, all of the color information in the image data converted into the L*a*b* values through the edit profile is included in the common color reproduction region 70 similarly to the case of the display 91. Therefore, the color information is also included in the color reproduction regions of the printers 92a and 92b and the color conversion in step S36 does not involve color space compression. That is, color reproduction is executed in a range restricted to the common color reproduction region 70 even if using either one of the printers 92a and 92b.

In steps S31 to S37, because color space compression (e.g. gamut mapping) is not necessary at all, the color of an image displayed on the display 91 is properly color-matched with the color of images printed by the printers 92a and 92b. Color tone recognized by the operator through the display 91 is properly reproduced by the printers 92a and 92b.

Figure 7:
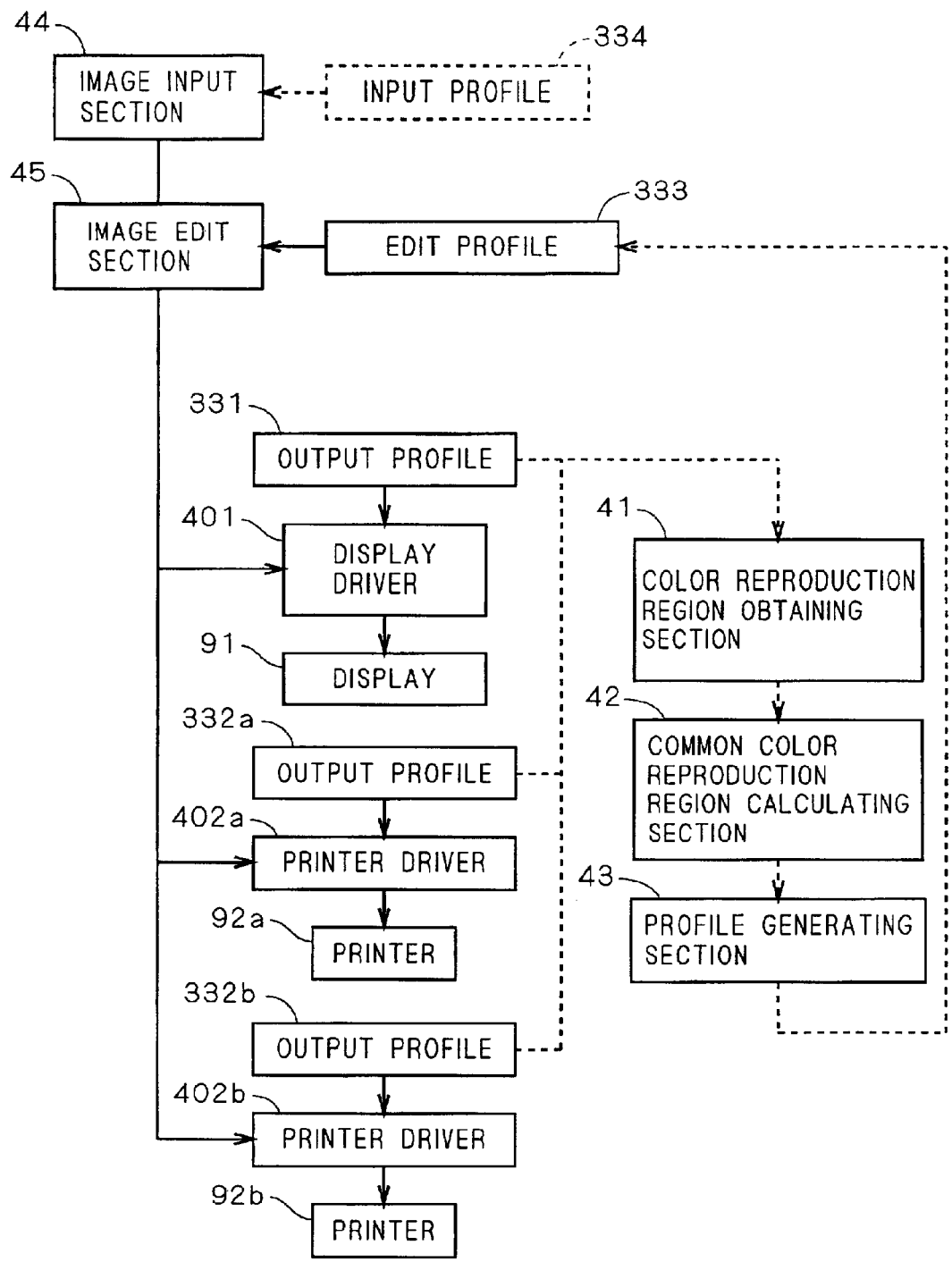
FIG. 7 is a block diagram showing functional components of the color management system shown in FIG. 1.

FIG. 7 is a block diagram showing functional components for realizing operations of the computer 1 shown in FIGS. 5 and 6. That is, a color reproduction region obtaining section 41, a common color reproduction region calculating section 42, and a profile generating section 43 shown in FIG. 7 are functions realized by the CPU 21, the ROM 22, and the RAM 23 while executing the color management program 31 by the computer 1. An image input section 44 is a function to be realized by a device driver of an input device (or operating system) and the image edit program 32, an image edit section 45 shows a function realized by the image edit program 32, and other drivers are functions realized by executing programs on the computer 1.

It is also allowed that a part or the whole of the functional components shown in FIG. 7 are constituted of exclusive electric circuits.

When the color management program 31 is executed (FIG. 3), output profiles 331, 332a, and 332b related to device drivers 401, 402a, and 402b for controlling the display 91 and the printers 92a and 92b are detected by the color reproduction region obtaining section 41, and color reproduction regions of output devices are obtained. Thereafter, the common color reproduction region 70 is calculated by the common color reproduction region calculating section 42 and the edit profile 333 restricted to the common color reproduction region 70 is generated and updated by the profile generating section 43. The color information in image data is previously restricted to the color information in the common color reproduction region 70 in subsequent image editing by the image edit section 45 and displaying and printing of images are also restricted to the color information in the common color reproduction region 70.

When image data is input (FIG. 5) and an input profile 334 is related to the image data, the image data is converted by the image input section 44 and then mapping is performed. The image data is converted again and sent to the image edit section 45. If the input profile 334 is not related to the image data, the image data is directly sent to the image edit section 45. Thereby, the image data input from an input device (including a virtual device for inputting image data from a recording device) is substantially related into the common color reproduction region before the image data is handled.

Step S23 in FIG. 5 is described that mapping is executed after conversion through the input profile 334. However, it is also allowed to update the input profile in accordance with the common color reproduction region 70 so that image data is mapped on the common color reproduction region 70 by the conversion through the input profile.

The configuration and operations of the color management system of the first preferred embodiment are described above. In this preferred embodiment, the maximum region in the color space (common color reproduction region 70) in which colors can be reproduced by all output devices connected to the computer 1 (a color management system) is determined as a standard color reproduction region. The range of the information in image data to be handled is previously restricted into the common color reproduction region 70. Therefore, when the image data handled in the computer 1 is output from the output devices (the display 91, the printers 92a and 92b and so on), color space compression is unnecessary and the image data is quickly output.

Proper color matching is realized in any output device because color space compression is not performed when image data is output. It is possible to directly print out a precise color which is reproduced on the display 91 from either one of the printers 92a and 92b.

Furthermore, the common color reproduction region 70 is obtained in accordance with the color reproduction regions of output devices connected to the computer 1. Therefore, the color reproduction capacity of the output devices are not unnecessarily decreased. The best color reproduction capacity corresponding to the image processing system constituted of the computer 1 and the output devices is brought out, and the system is suitable for offices and high end users sharing the image processing operation by using a plurality of output devices.

<2. Second Preferred Embodiment>

Figure 8:
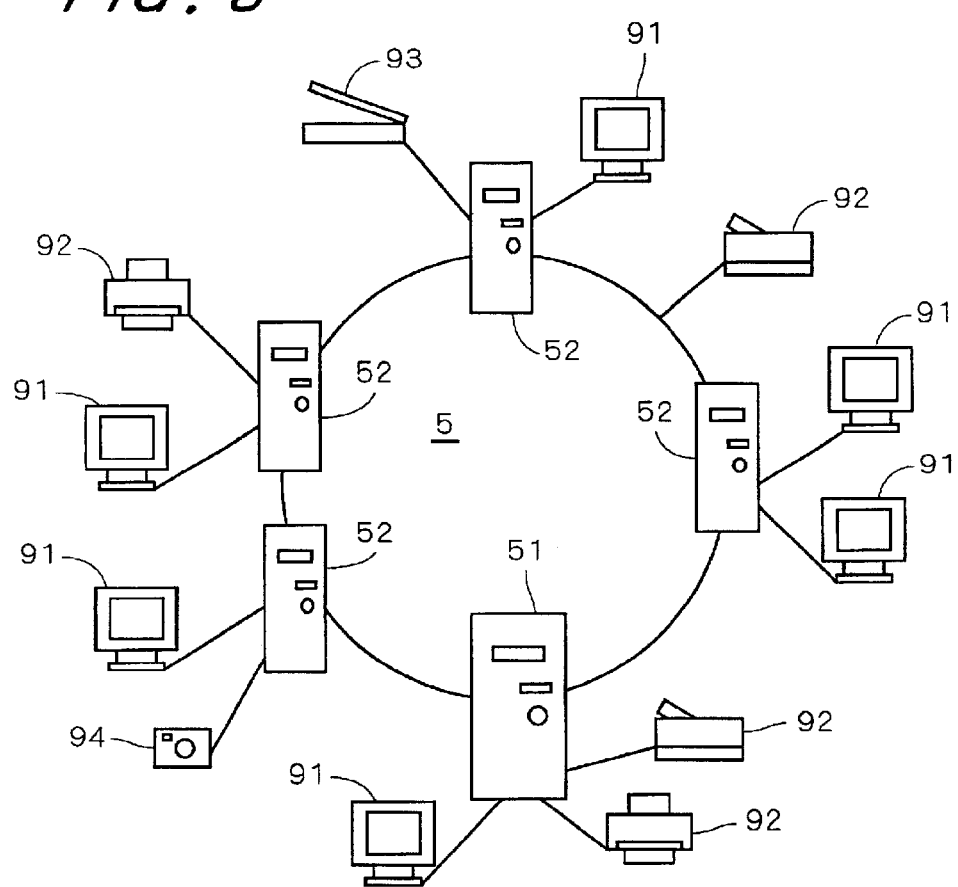
FIG. 8 shows a configuration of color management system of the second and third preferred embodiments.

Then, an aspect for realizing the color management system of the first preferred embodiment by a computer network is described as the second preferred embodiment. FIG. 8 is an illustration showing a computer network 5 in which a plurality of clients 52 are connected to a color managing server 51. Moreover, various input/output devices such as a display 91, a printer 92, a scanner 93, and a digital camera 94 are connected to the server 51 and the clients 52 (the server and clients are hereafter generally referred to as "machines").

Figure 9:
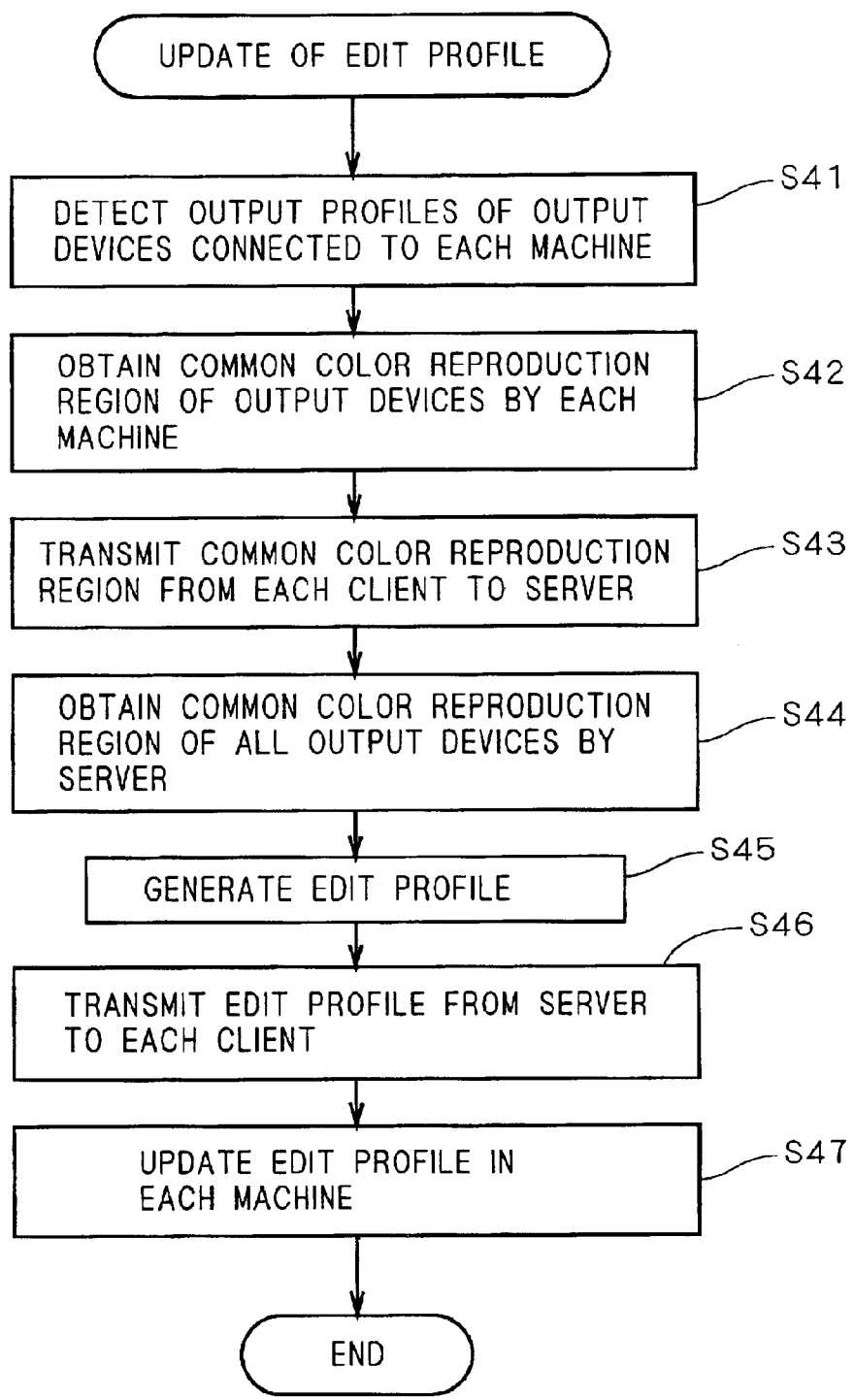
FIG. 9 is a flowchart showing operations of the color management system of the second preferred embodiment.

FIG. 9 is an illustration showing a flow of operations of the computer network 5 which serves as a color management system. A color management program is previously installed in each machine through a recording medium similarly to the case of the first preferred embodiment or a communication medium and the computer network 5 functions as a color management system when the color management program is executed.

In the color management system constituted on the computer network 5, output profiles of output devices connected to each machine are detected (step S41). Then, similarly to the case of the first preferred embodiment, a common color reproduction region of the output devices is obtained by each machine (step S42). To reduce the information content in the common color reproduction region, the common color reproduction region is approximated to a polyhedron.

Figure 10:
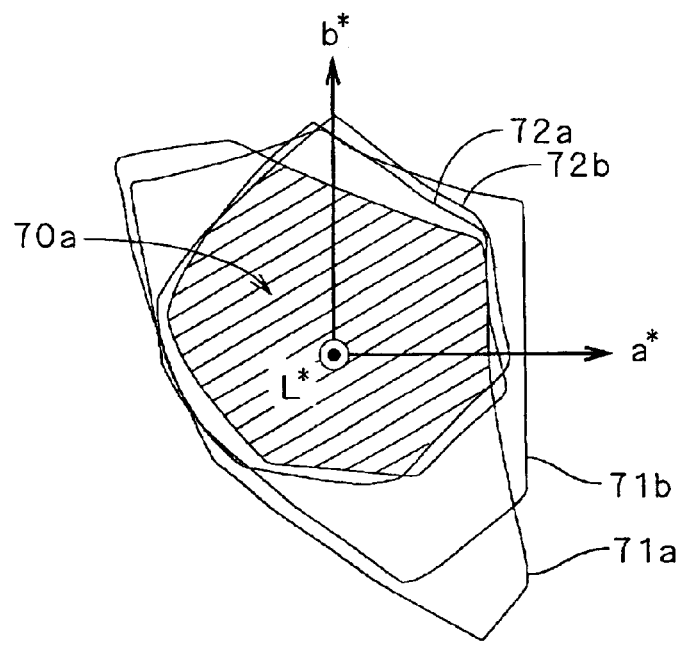
FIGS. 10 and 11 are schematic views showing the way to obtain a common color reproduction region.
Figure 11:
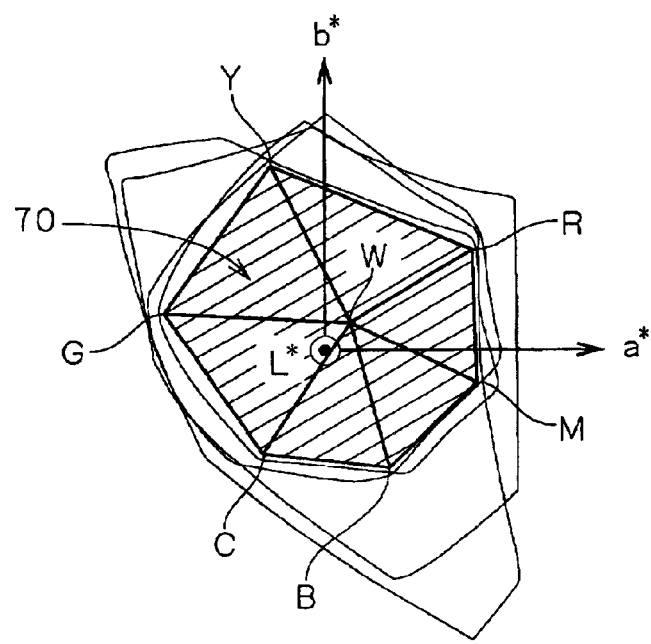

FIGS. 10 and 11 are illustrations showing the way to obtain a common color reproduction region as a polyhedron by each machine. In FIG. 10, symbols 71a and 71b respectively denote color reproduction regions of displays and symbols 72a and 72b respectively denote color reproduction regions of printers. A region 70a shown by parallel slashes in FIG. 10 denotes a conjunction of color reproduction regions of the output devices, and corresponding to a temporary common color reproduction region 70a. FIG. 10 schematically shows the temporary common color reproduction region 70a as a two-dimensional region similarly to the case of FIG. 4.

In FIG. 11, a region shown by parallel slashes is an illustration of the common color reproduction region 70 which is generated as a polyhedron included in (preferably, inscribed with) the temporary color reproduction region 70a. In FIG. 11, symbols R, G, B, C, M, and Y show positions corresponding to red, green, blue, cyan, magenta, and yellow and W shows a position corresponding to white. As already described, the common color reproduction region 70 is a solid also expanding in the L*-axis direction and W shows a vertex present in the (+L*) direction. A vertex corresponding to K (black) is present in the (−L*) direction though it is not illustrated in FIG. 11. By connecting the vertexes W and K with the vertexes of RGBCMY, the common color reproduction region 70 is obtained as a polyhedron having eight vertexes.

After the common color reproduction region 70 is obtained by each machine, it is transmitted to the server 51 from each client 52 (step S43). The server 51 further obtains the conjunction of common color reproduction regions obtained by the machines and obtains a common color reproduction region for all output devices of the system (step S44). Then, the server 51 generates an edit profile restricted to the common color reproduction region of the system (step S45).

The generated edit profile is transmitted to each client 52 from the server 51 (step S46) and updated in each machine (step S47). Thereby, the information in the image data handled by each machine is previously restricted to the common color reproduction region of the system similarly to the case of the computer 1 of the first preferred embodiment. As a result, the color information in image data restricted to color information in the color reproduction regions of the displays and the printers connected to the machines. Color space compression is unnecessary when image data is output by each output device, and moreover it is possible to print out images by the printer with accurately conforming to the color tone of images displayed on the display. That is, color matching is properly realized among all output devices of the system.

Moreover, the common color reproduction region of the system is obtained as an almost maximum color reproduction region common to output devices connected to the computer network 5 (that is, color management system). Color reproduction suitable for the user's system is realized without unnecessary restriction to the color reproduction range of each output device.

Figure 12:
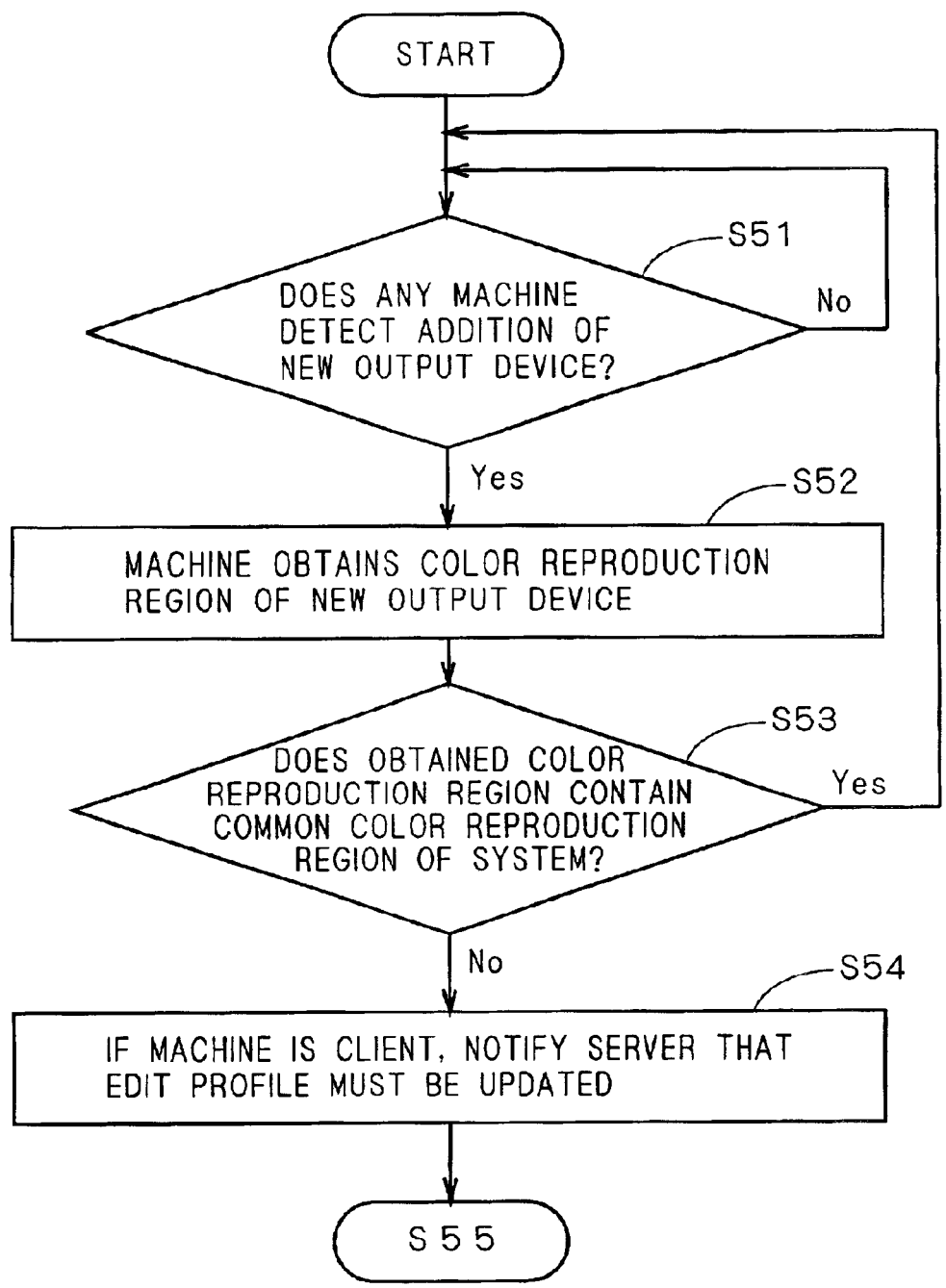
FIGS. 12 and 13 are flowcharts showing operations of the color management system when a new output device is added.
Figure 13:
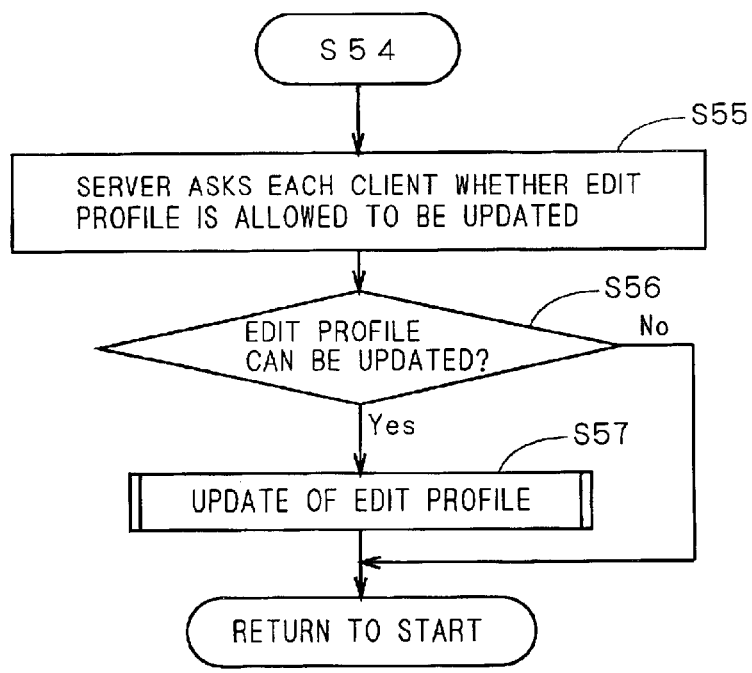

Then, operations of the computer network 5 for automatically updating the edit profile when a new output device is added to any machine are described below by referring to FIGS. 12 and 13.

The color management system which is the computer network 5 monitors whether a new output device is added to any machine by using the plug-and-play function of each machine or regularly by the server 51 (step S51). When addition of a new output device is detected (for example, when a device driver or an output profile is automatically detected by the operating system), the machine to which the output device is added refers to the output profile of the output device and obtains the color reproduction region of the output device (step S52). The machine confirms whether the obtained color reproduction region contains the common color reproduction region of the system (step S53). If the obtained color reproduction region contains the common color reproduction region of the system, it is possible to properly reproduce colors even if directly using the edit profile which is currently used. Therefore, the edit profile is not updated.

If the obtained color reproduction region does not contain the common color reproduction region of the system, color may not be properly reproduced by the added output device though the color information is included in the common color reproduction region of the system. When the machine to which the output device is added is the client 52, it is communicated to the server 51 that the edit profile must be updated (step S54). When the machine to which the output device is added is the server 51, it is determined by the server 51 that the edit profile must be updated.

In the case that the edit profile must be updated, inquiry about whether the edit profile is allowed to be updated at present is sent to each client 52 from the server 51 (step S55). The above inquiry is executed in order to prevent image editing from causing unexpected trouble because the edit profile is updated when an output device is currently used by a machine or image editing for a certain period is reserved.

If update of the edit profile is not permitted as the result of the inquiry, the new output device is additionally connected to the color management system (computer network 5) but the edit profile is not updated (step S56). When the new output device is used under the above state, warning that accurate color reproduction may not be executed is displayed for the operator.

As the result of the inquiry, if the edit profile can be updated, a series of operations shown in FIG. 9 are executed and the edit profile of each machine is updated (steps S56 and S57). That is, the common color reproduction regions of the clients 52 are sent to the server 51 and the edit profile restricted to the common color reproduction region of the system (or all output devices) is generated by the server 51 and the edit profile is updated in each machine.

Through the above operations, when an output device is additionally connected, the new output device is automatically included in the output devices connected the system and the edit profile is updated.

In the case of applying the above operations of the color management system to the functional components shown in FIG. 7, each machine corresponds to the color reproduction region obtaining section 41, the common color reproduction region calculating section 42, the image input section 44, and the image edit section 45. The server 51 corresponds to the common color reproduction region calculating section 42 and the profile generating section 43 of the system. Moreover, though not shown in FIG. 7, the function for detecting a new output device serves as a function for starting update of the edit profile (refer to the output device detecting section 48 in FIG. 21).

The function of each machine for detecting a new output device also substantially serves as a function for including the additionally-added output device in all output devices connected on the computer network 5.

It is described above that the common color reproduction region is obtained by each machine and then, the common color reproduction region of the whole system is obtained by the server 51. The color reproduction region of each output device can be directly transmitted to the server 51 from each client 52 and then, the common color reproduction region of the system is obtained by the server 51.

Furthermore, operations for detecting a new output device and updating an edit profile are applicable to the case where the color management system is constituted in an independent computer. That is, it is also allowed that the edit profile is automatically updated in the first preferred embodiment. In this case, the communication between the server 51 and the clients 52 is omitted in the flow of operations in FIGS. 12 and 13.

<3. Third Preferred Embodiment>

Then, operations of the color management system of the third preferred embodiment of the present invention are described below. The color management system is constituted on the computer network 5 shown in FIG. 8 and symbols in FIG. 8 are properly cited.

Figure 14:
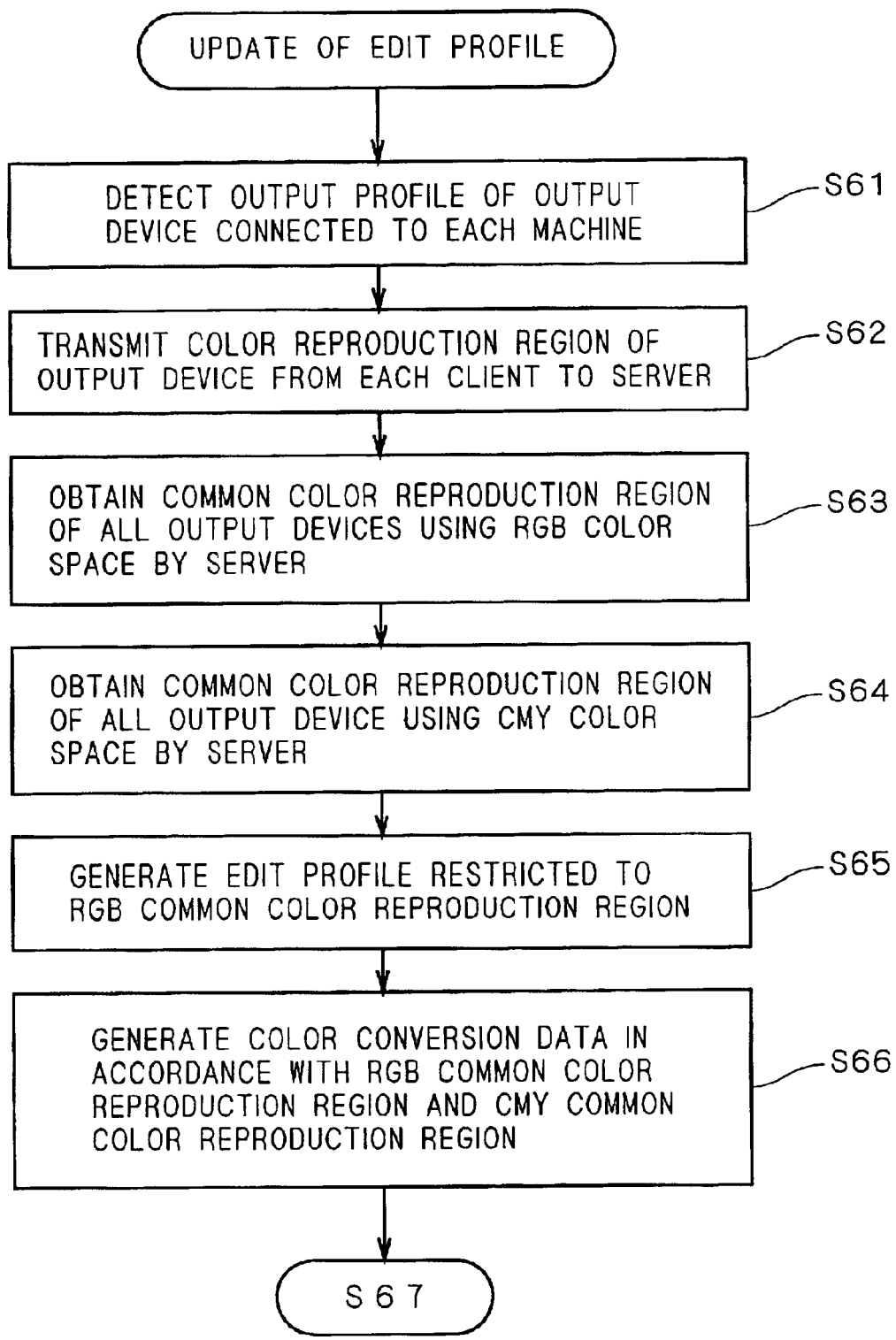
FIGS. 14 and 15 are flowcharts showing operations of the color management system of the third preferred embodiment.
Figure 15:
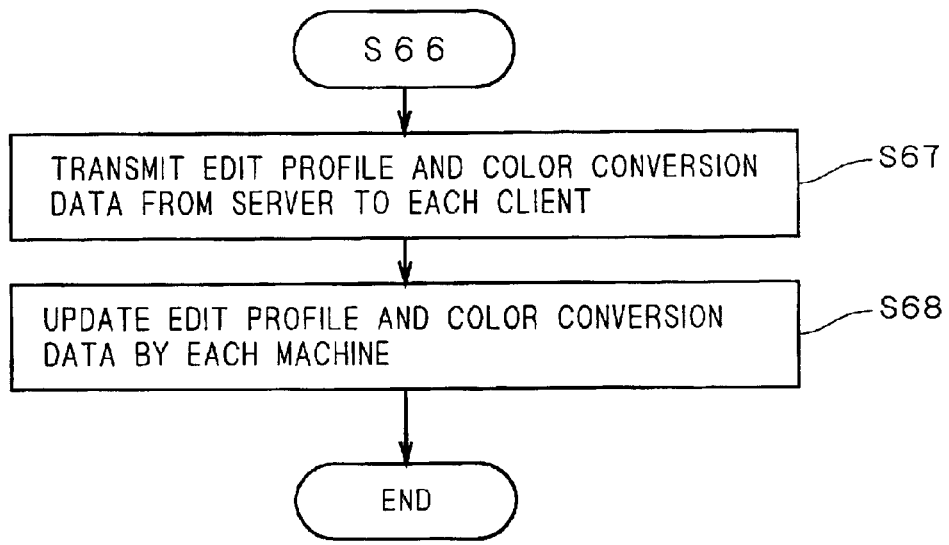

FIGS. 14 and 15 are flowcharts showing flows of operations for updating the edit profile of the color management system of the third preferred embodiment. First, output profiles of output devices connected to each machine are detected similarly to the case of the second preferred embodiment (step S61). Then, the information of the color reproduction region of each output device is transmitted to the server 51 from each client 52 together with the type of the output device in accordance with the detected output profile (step S62).

The server 51 classifies obtained color reproduction regions into those of output devices using RGB color space (that is, outputting in accordance with RGB values) and those of output devices using CMY color space (that is, outputting in accordance with CMY values). Then, a common color reproduction region which is the conjunction of the color reproduction regions of all output devices using RGB color space (hereafter referred to as "RGB common color reproduction region") is obtained and a common color reproduction region which is the conjunction of the color reproduction regions of all output devices using CMY color space (hereafter referred to as "CMY common color reproduction region) is obtained (steps S63 and S64).

Figure 16:
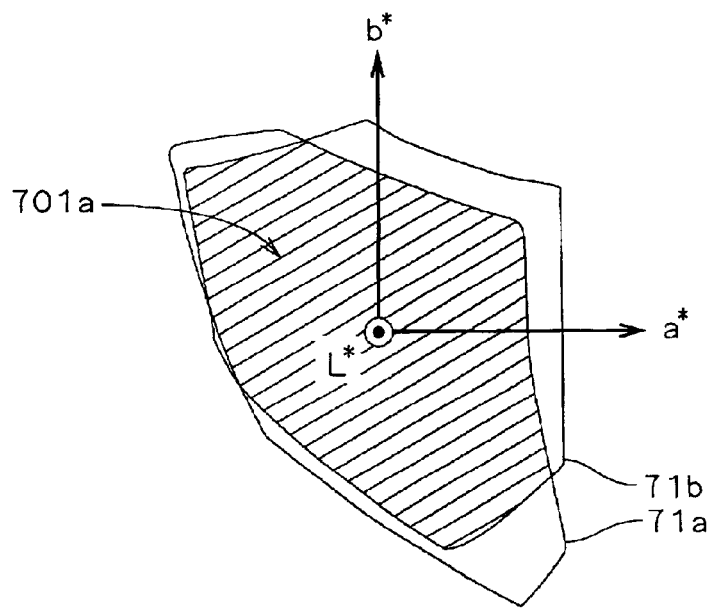
FIGS. 16 and 17 are schematic views showing the way to obtain a common color reproduction region for displays.
Figure 17:
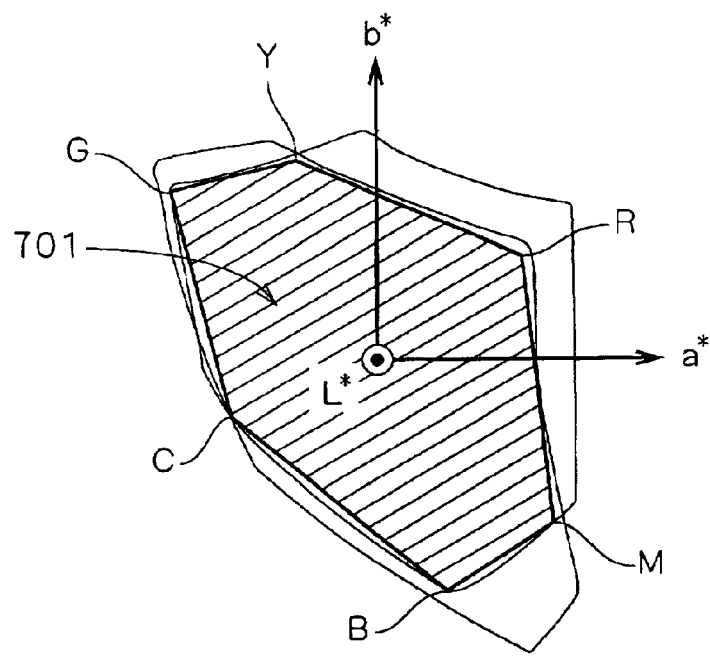

FIGS. 16 and 17 are illustrations for explaining the way of obtaining the RGB common color reproduction region. In FIG. 16, symbols 71a and 71b denote color reproduction regions of two displays. Actually, however, the RGB common color reproduction region is obtained for color reproduction regions of all output devices using RGB color space which are connected to the computer network 5.

Operations for obtaining the RGB common color reproduction region are the same as those described with FIGS. 10 and 11. First, the conjunction of all color reproduction regions are obtained in FIG. 16 and the region of the conjunction is determined as a temporary RGB common color reproduction region 701a. FIG. 16 schematically shows the temporary RGB common color reproduction region 701a three-dimensionally expanding in L*a*b* color space on two dimensions and the same is true for FIGS. 17 to 19.

Then, as shown in FIG. 17, a polyhedron contained in (preferably, inscribed with) the temporary RGB common color reproduction region 701a is obtained by connecting positions almost corresponding to colors of RGBCMY with positions corresponding to WK (white and black, not illustrated) present in the L*-axis direction. The region inside of the obtained polyhedron is decided as the RGB common color reproduction region 701.

Figure 18:
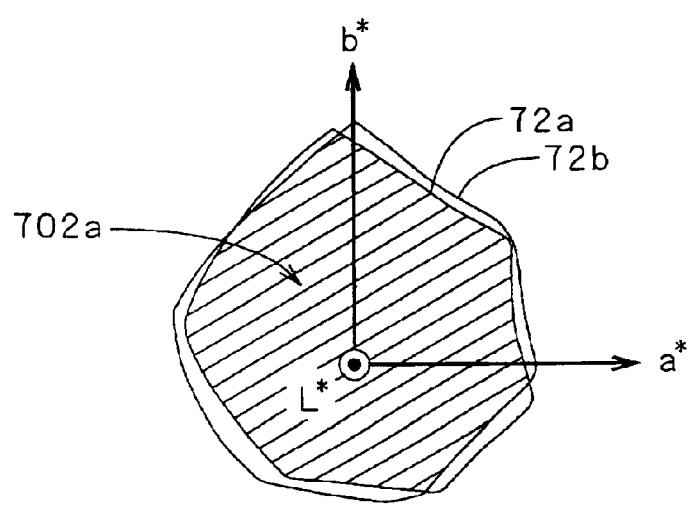
FIGS. 18 and 19 are schematic views showing the way to obtain a common color reproduction region for printers.
Figure 19:
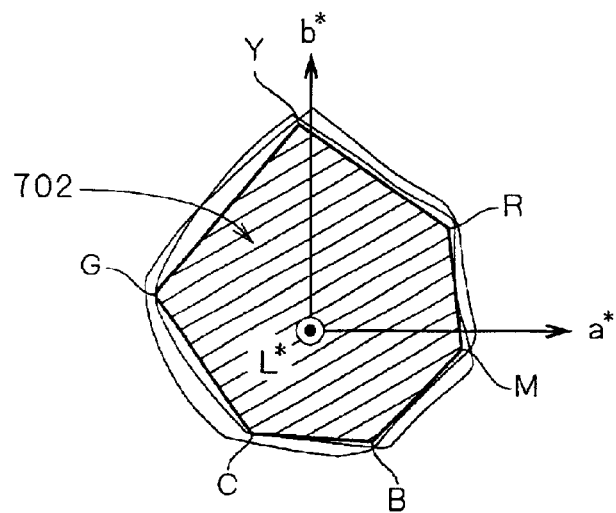

FIGS. 18 and 19 are illustrations for explaining the way of obtaining a CMY common color reproduction region similarly to the case of the RGB common color reproduction region. In FIG. 18, symbols 72a and 72b denote color reproduction regions of two printers. Actually, however, the CMY common color reproduction region is obtained for color reproduction regions of all output devices using CMY color space which are connected to the computer network 5.

As shown in FIGS. 18 and 19, the conjunction of color reproduction regions is obtained as a temporary CMY common color reproduction region 702a and a polyhedron inscribed with the temporary CMY common color reproduction region 702a is obtained as the CMY common color reproduction region 702.

After the RGB common color reproduction region 701 and the CMY common color reproduction region 702 are obtained, an edit profile restricted to the RGB common color reproduction region 701 is generated (step S65). Moreover, when printing is executed (to be accurate, when outputting is performed by an output device using the CMY color space), color conversion data for converting color information is generated from the RGB common color reproduction region 701 and CMY common color reproduction region 702 (step S66). That is, the data for converting the color information in the RGB common color reproduction region 701 into the color information in the CMY common color reproduction region 702 is generated.

The edit profile and the color conversion data are transmitted to each client 52 form the server 51 (step S67) and the edit profile and the color conversion data are updated in each machine (step S68). Thereby, the color information in the image data to be handled in image editing restricted to the RGB common color reproduction region 701, and color conversion according to the color conversion data is executed when outputting is performed by an output device using CMY color space.

Figure 20:
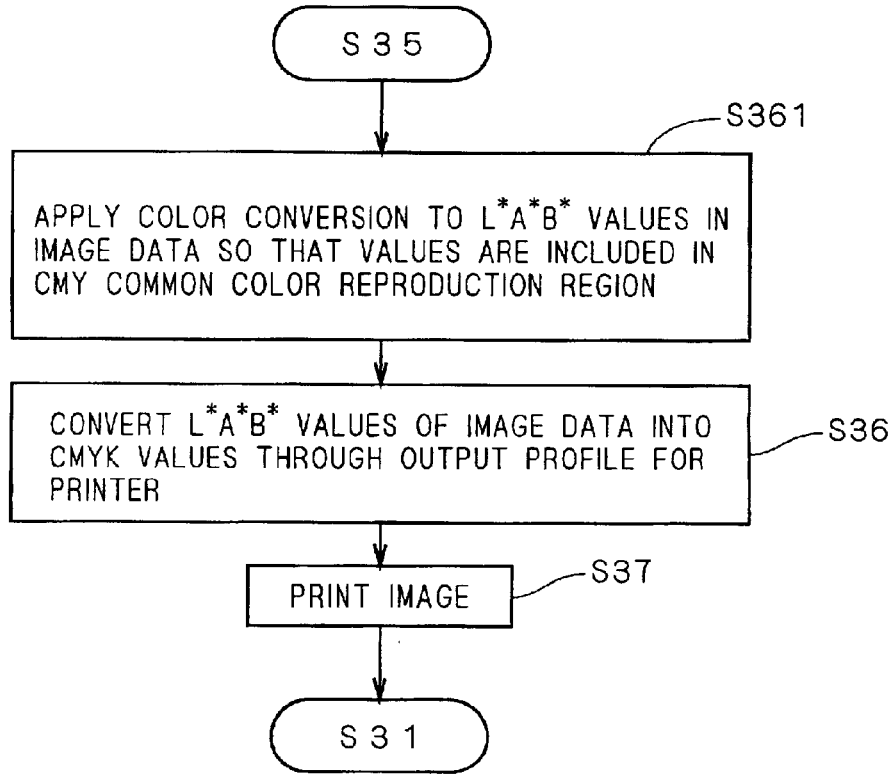
FIG. 20 is a flowchart showing operations of the third preferred embodiment under printing.

Then, image output operations of each machine after the edit profile and the color conversion data are updated are described below. The following description is made by assuming that only the displays 91 are the output device using RGB color space and only the printers 92 are the output device using CMY color space as shown in FIG. 8. The image output operations are different from the operations shown in FIG. 6 only in that step S361 shown in FIG. 20 is added before step S36 and the description is made by properly using the symbols shown in FIG. 6. Input and editing of image data are almost the same as those shown in FIG. 5.

While an image is edited, steps S31 to S34 in FIG. 6 are repeatedly executed and the image is displayed. Because the edit profile is restricted to the RGB common color reproduction region 701, color space compression is unnecessary when displaying the image on the display 91. Therefore, high-speed image displaying is realized. Moreover, because color space compression is not executed, color matching is properly realized between displays on the computer network 5.

When an image is printed, the L*a*b* values in image data which are restricted to the RGB common color reproduction region 701 are converted (mapped) into the CMY color reproduction region 702 (step S361). That is, a region corresponding to the RGB common color reproduction region 701 is converted into a region corresponding to the CMY common color reproduction region 702 in L*a*b* color space. In this process, color space compression is performed if necessary.

The L*a*b* values in the image data is converted into CMYK values through the output profile of the printer 92 (step S36) and printed by the printer 92 (step S37). That is, by converting image data to be output by the printer 92 in accordance with the common color conversion data, the image data is printed at the same color tone by any printer 92. As a result, color matching is properly realized between printers.

Figure 21:
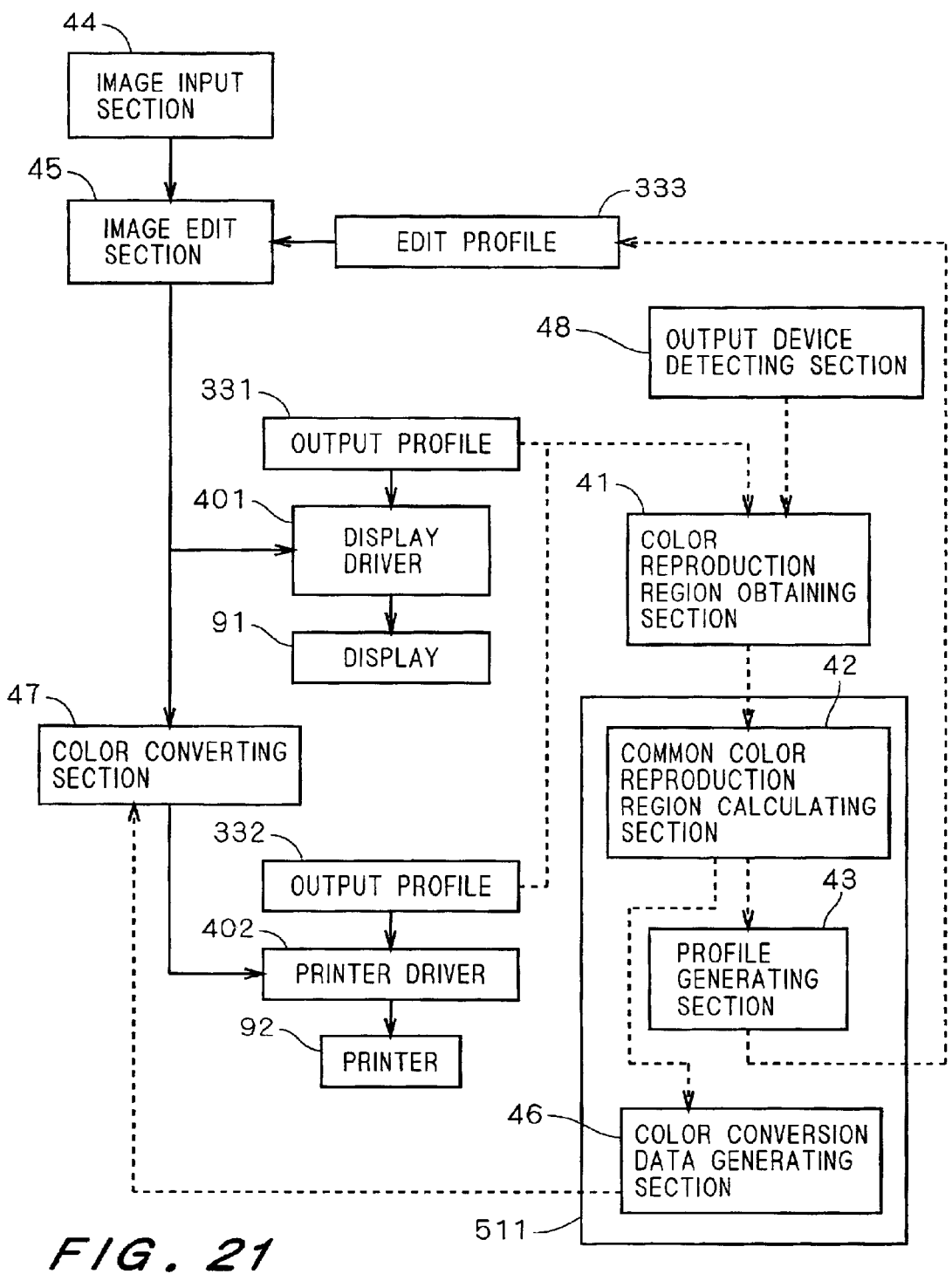
FIG. 21 is a block diagram showing functional components of the color management system of the third preferred embodiment.

FIG. 21 is a block diagram showing functional components of the computer network 5 for performing the above operations. In FIG. 21, the functional components in the rectangle shown by symbol 511 are peculiar to the server 51 and other functional components are included in each machine (that is, server 51 and clients 52).

In each machine, output profiles 331 and 332 of the display 91 and the printer 92 are obtained by the color reproduction region obtaining section 41 and supplied to the common color reproduction region calculating section 42 of the server 51, and thereby the RGB common color reproduction region 701 and the CMY common color reproduction region 702 are obtained.

The edit profile 333 restricted to the RGB common color reproduction region 701 is generated by the profile generating section 43 of the server 51 and the edit profile 333 is updated by each machine. As a result, the image data input through the image input section 44 to the image edit section 45 is handled as image data whose color information range is restricted. When an image is displayed on the display 91, the display driver 401 performs color conversion which does not involve color space compression in accordance with the output profile 331.

Color conversion data is generated from the RGB common color reproduction region 701 and the CMY common color reproduction region 72 by the color conversion data generating section 46 of the server 51 and updated by each machine. The color information in image data restricted to the RGB common color reproduction region 701 is converted into color information restricted to the CMY common color reproduction region 702 by the color converting section 47 when printing is executed. The printer driver 402 performs color conversion of image data which does not involve color space compression in accordance with the output profile 332 and the image data is printed by the printer 92.

In the case of controlling the printer 92 on the computer network 5 by a print server, it is also allowed that update of the color conversion data is performed only in the print server and color conversion for printing is performed by the print server. In this case, the color converting section 47 corresponds to the function of the print server.

As described above, the color management system of the third preferred embodiment obtains the RGB common color reproduction region and the CMY common color reproduction region separately from each other. It is possible to properly realize color matching between displays 91 and color matching between printers 92. That is, the common color reproduction region of output devices for performing color reproduction through a specific process and the common color reproduction region of output devices for performing color reproduction through another specific process are obtained, and color information in image data is converted between common color reproduction regions. Therefore, the frequency of color space compressions is reduced and it is assured that color tones of images are the same between output devices using the same color reproduction process.

The common color reproduction region to be used depends on the color reproduction process of the output device. The range for each output device to perform color reproduction is unnecessarily narrowed.

In the above explanation, the RGB common color reproduction region and the CMY common color reproduction region are obtained on the computer network 5 and the edit profile and the color conversion data are updated. These operations can be also applied to the case where one computer is used and a plurality of displays 91 and/or a plurality of printers 92 are connected to the computer like the case of the first preferred embodiment.

That is, by excluding operations for the communication between the server 51 and the clients 52 from the operations shown in FIGS. 14 and 15, it is possible to realize operations of one computer. When a plurality of displays 91 are connected to one computer and images are edited by a plurality of operators, operators can recognize images of the same color and print images having the same color tone by any printer 92.

Moreover, in the case of the third preferred embodiment, when a new output device is detected by any machine, the edit profile and the color conversion data may be automatically updated. Operations in the above case are almost the same as those shown in FIGS. 12 and 13, but the color reproduction region obtained in step S53 is compared with the common color reproduction region corresponding to the color reproduction process and it is determined whether to update the edit profile and/or the color conversion data. The function of automatically updating the edit profile (or the color conversion data) in FIG. 21 is illustrated as an output device detecting section 48 which detects a new output device and transmits a signal to the color reproduction region obtaining section 41 in order to include the new output device in the group of output devices connected to the system.

Furthermore, in the third preferred embodiment, the edit profile is generated in accordance with the RGB common color reproduction region 701. However, it is also allowed that the edit profile is generated in accordance with the CMY common color reproduction region 702. In this case, the color conversion for restricting color information to the RGB common color reproduction region 701 is performed in displaying an image on the display 91, and only the color conversion which does not involve color space compression is performed when printing is performed. That is, the color converting section 47 shown in FIG. 21 is connected to the display driver 401.

<4. Modification>

The present invention is not restricted to the preferred embodiments but various modifications are allowed.

For example, in the case of the above preferred embodiments, the color information of image data to be handled is previously restricted to the common color reproduction region by updating the edit profile. However, it is possible to realize the same color management even by an image edit software which does not use an edit profile through restricting the color reproduction region determined by the output profile of a display or a printer to the common color reproduction region.

In the case of the second and third preferred embodiments, where the color management system which is the computer network 5 is described, the functions of the server 51 and clients 52 are properly changed. For example, it is allowed to perform operations from detecting a new output device up to updating the edit profile under the control by the server 51.

The scales of the computer 1 and the computer network 5 are optional. In the case of the preferred embodiments, the common color reproduction region (or the RGB common color reproduction region and the CMY common color reproduction region) is (or are) obtained by restricting it (or them) only to the output devices managed by the color management system. Therefore, performances of the output devices are not unnecessarily restricted. It is possible to construct a color management system suitable for high end users by adopting only high performance output devices.

The above preferred embodiments have been described only for output devices actually connected to the color management system. A virtual output device not actually connected to the system may be included in the output devices. In this case, only the output profile of the virtual output device is present.

Each output device may be automatically or manually calibrated before obtaining the color reproduction region of the output device.

In the second and third preferred embodiments, the server (color management server) 51 is a specific machine, but it is adoptable that any machine on the computer network 5 functions as the server. For example, the machine first powered on functions as the server.

In the second and third preferred embodiments, an output device(s) is connected to each machine, it is allowed that an output device directly connected to the computer network 5 without through a machine, and an arbitrary machine detects the connection and manages the output device.

In the case of the second and third preferred embodiments, the output profile of the output device is present in each machine, however, the server can collectively manage the output profiles. In the third preferred embodiment, output profiles of printers can be collectively managed by the print server.

Furthermore, in the above preferred embodiments, though the common color reproduction region is obtained from all output devices connected to the color management system or all output devices for each color reproduction process, it is allowed to obtain a common color reproduction region from a part of output devices and the edit profile is updated. Even in this case, when outputting is performed by an output device related to an output profile which is used as the base of the common color reproduction region, color space compression is unnecessary and it is possible to quickly output an image. For example, it is allowed that a common color reproduction region is obtained in accordance with only output profiles of displays which are connected to machines used for image editing in the computer network 5. In this case, it is assured that images are displayed by these displays at a high speed and the same color tone.

While the invention has been described in detail, the foregoing description is in all aspects illustrative and not restrictive. It is understood that numerous other modifications and variations can be devised without departing from the scope of the invention.

What is claimed is:

1. A color management system to be connected with a plurality of output devices which execute color reproduction in accordance with image data, said color management system comprising:

means for obtaining a plurality of color reproduction regions from at least two output devices included in said plurality of output devices, said plurality of color reproduction regions corresponding to regions in color space where said at least two output devices can reproduce color, respectively;

means for generating a common color reproduction region included in any of said plurality of color reproduction regions; and means for restricting range of color information included in image data to said common color reproduction region before said image data is handled.

2. The color management system of claim 1, wherein said at least two output devices are all of said plurality of output devices.

3. The color management system of claim 1, wherein said at least two output devices are devices which reproduce color through a specific process among said plurality of output devices.

4. The color management system of claim 3, wherein said devices which reproduce color through said specific process are displays.

5. The color management system of claim 3, wherein said devices which reproduce color through said specific process are printers.

6. The color management system of claim 3, wherein said means for obtaining said plurality of color reproduction regions and said means for generating said common color reproduction region further generate another common color reproduction region related to at least two output devices which reproduce color through another specific process among said plurality of output devices, and said color management system further comprising means for converting color information included in said common color reproduction region to color information included in said another common color reproduction region.

7. The color management system of claim 1, further comprising means for mapping input image data on said common color reproduction region.

8. The color management system of claim 1, wherein said plurality of output devices are connected to a computer network.

9. The color management system of claim 1, further comprising means for detecting an output device connected additionally and including said output device in said plurality of output devices.

10. The color management system of claim 1, wherein said common color reproduction region is generated as a region in common color space independent of said at least two output devices, said means for restricting range of color information generates a profile for converting said region in said common color space to a region in color space for editing image data, and said color management system handles said image data in said color space for editing.

11. The color management system of claim 10, wherein said common color space is L*a*b* color space.

12. The color management system of claim 10, wherein said common color space is XYZ color space.

13. The color management system of claim 10, wherein said color space for editing is RGB color space.

14. The color management system of claim 1, wherein said means for generating said common color reproduction region generates a maximum region included in any of said plurality of color reproduction regions as said common color reproduction region.

15. The color management system of claim 1, wherein said at least two output devices include both of an output device using RGB color space and an output device using CMY color space.

16. The color management system of claim 15, wherein said output device using RGB color space is a display, and said output device using CMY color space is a printer.

17. The color management system of claim 1, wherein said means for generating said common color reproduction region approximates said common color reproduction region to a polyhedron.

18. A color managing method performed on a color management system connected with a plurality of output devices which execute color reproduction in accordance with image data, said color managing method comprising the steps of:

a) obtaining a plurality of color reproduction regions from at least two output devices included in said plurality of output devices, said plurality of color reproduction regions corresponding to regions in color space where said at least two output devices can reproduce color, respectively;

b) generating a common color reproduction region included in any of said plurality of color reproduction regions; and c) restricting range of color information included in image data to said common color reproduction region before said image data is handled.

19. The color managing method of claim 18, further comprising the step of d) including an output device connected to said color management system additionally in said plurality of output devices, and performing said steps a) to c).

20. The color managing method of claim 18, wherein said common color reproduction region is generated as a region in common color space independent of said at least two output devices, and a profile for converting said region in said common color space to a region in color space for editing image data is generated in said step c), said method further comprising the step of handling said image data in said color space for editing.

21. The color managing method of claim 20, wherein said color space for editing is RGB color space.

22. The color managing method of claim 18, wherein a maximum region included in any of said plurality of color reproduction regions is generated as said common color reproduction region in said step b).

23. The color managing method of claim 18, wherein said at least two output devices include both of an output device using RGB color space and an output device using CMY color space.

24. The color managing method of claim 23, wherein said output device using RGB color space is a display, and said output device using CMY color space is a printer.

25. A recordable medium having recorded thereon a program for color managing on a computer connected with a plurality of output devices which execute color reproduction in accordance with image data, wherein execution of said program product by said computer causes said computer to perform a process comprising the steps of:

a) obtaining a plurality of color reproduction regions from at least two output devices included in said plurality of output devices, said plurality of color reproduction regions corresponding to regions in color space where said at least two output devices can reproduce color, respectively;

b) generating a common color reproduction region included in any of said plurality of color reproduction regions; and c) restricting range of color information included in image data to said common color reproduction region before said image data is handled.

26. The recordable medium of claim 25, wherein said common color reproduction region is generated as a region in common color space independent of said at least two output devices, and a profile for converting said region in said common color space to a region in color space for editing image data is generated in said step c), said process further comprising the step of handling said image data in said color space for editing.

27. The recordable medium of claim 26, wherein said color space for editing is RGB color space.

28. The recordable medium of claim 25, wherein a maximum region included in any of said plurality of color reproduction regions is generated as said common color reproduction region in said step b).

29. The recordable medium of claim 25, wherein
said at least two output devices include both of an output device using RGB color space and an output device using CMY color space.

30. The recordable medium of claim 29, wherein
said output device using RGB color space is a display, and said output device using CMY color space is a printer.

31. A color management system to be connected with a plurality of output devices which execute color reproduction in accordance with image data, said color management system comprising:
 a memory in which a program is stored; and
 a processor performing a process in accordance with said program stored in said memory, said process comprising the steps of:
 a) obtaining a plurality of color reproduction regions from at least two output devices included in said plurality of output devices, said plurality of color reproduction regions corresponding to regions in color space where said at least two output devices can reproduce color, respectively;
 b) generating a common color reproduction region included in any of said plurality of color reproduction regions; and
 c) restricting range of color information included in image data to said common color reproduction region before said image data is handled.

32. The color management system of claim 31, wherein
said common color reproduction region is generated as a region in common color space independent of said at least two output devices, and
a profile for converting said region in said common color space to a region in color space for editing image data is generated in said step c),
said process further comprising the step of handling said image data in said color space for editing.

33. The color management system of claim 32, wherein
said color space for editing is RGB color space.

34. The color management system of claim 31, wherein
a maximum region included in any of said plurality of color reproduction regions is generated as said common color reproduction region in said step b).

35. The color management system of claim 31, wherein
said at least two output devices include both of an output device using RGB color space and an output device using CMY color space.

36. The color management system of claim 35, wherein
said output device using RGB color space is a display, and said output device using CMY color space is a printer.

* * * * *